United States Patent [19]

Borzym

[11] Patent Number: 5,373,764

[45] Date of Patent: * Dec. 20, 1994

[54] CONVEYOR FOR WORKSTATIONS

[76] Inventor: John Borzym, 4820 School Bell La., Birmingham, Mich. 48010

[*] Notice: The portion of the term of this patent subsequent to Oct. 27, 2009 has been disclaimed.

[21] Appl. No.: 948,154

[22] Filed: Sep. 21, 1992

Related U.S. Application Data

[63] Continuation of Ser. No. 728,649, Jul. 11, 1991, Pat. No. 5,157,999.

[51] Int. Cl.$^5$ .............................................. B26D 5/42
[52] U.S. Cl. ........................................ 83/385; 83/294; 83/455
[58] Field of Search .................. 83/13, 37, 298, 294, 83/300, 303, 311, 324, 325, 385, 455, 549

[56] References Cited

U.S. PATENT DOCUMENTS

| | | | |
|---|---|---|---|
| 1,603,254 | 10/1926 | Mangels | 104/53 |
| 1,844,837 | 2/1932 | Braun | 83/294 X |
| 1,939,196 | 12/1933 | Barber | 83/303 |
| 2,093,323 | 9/1937 | Lamoreaux | 83/325 X |
| 2,564,542 | 8/1951 | Milbourn | 104/53 |
| 2,580,959 | 1/1952 | Ropp et al. | 83/76 |
| 2,625,861 | 1/1953 | Swanson | 269/157 |
| 3,122,467 | 2/1964 | Hannon | 156/583.5 |
| 3,300,365 | 1/1967 | Roos | 156/361 |
| 3,672,248 | 6/1972 | Tsujimura et al. | 83/37 |
| 3,698,270 | 10/1972 | Gouttierre | 83/11 |
| 3,736,484 | 5/1973 | Reynolds et al. | 318/587 |
| 3,800,648 | 4/1974 | Nishiyori et al. | 83/479 |
| 3,822,647 | 7/1984 | Hill et al. | 104/130 |
| 3,890,763 | 6/1975 | Ullman | 83/614 X |
| 4,284,160 | 8/1981 | DeLiban et al. | 180/168 |
| 4,284,941 | 8/1981 | Regueiro | 318/587 |
| 4,346,635 | 8/1982 | Krauss et al. | 83/479 |
| 4,379,497 | 4/1983 | Hainsworth et al. | 180/168 |
| 4,465,177 | 8/1984 | Dorner | 198/482 |
| 4,473,787 | 9/1984 | Schick | 318/587 |
| 4,542,670 | 9/1985 | Borzym | 83/295 |
| 4,613,805 | 9/1986 | Matsuo et al. | 318/687 |
| 4,674,376 | 6/1987 | Hattori | 83/285 |
| 4,713,497 | 12/1987 | Smith | 191/12.2 R |
| 4,746,811 | 5/1988 | Agujaro | 307/147 |
| 4,757,893 | 7/1988 | Shabram, Jr. et al. | 198/474.1 |
| 4,817,750 | 4/1989 | Ishida et al. | 180/168 |
| 4,820,961 | 4/1989 | McMullin | 318/587 |

*Primary Examiner*—Richard K. Seidel
*Assistant Examiner*—Raymond D. Woods
*Attorney, Agent, or Firm*—Howard & Howard

[57] ABSTRACT

An apparatus for moving a workstation to perform work on a moving workpiece including moving the workstation through a first length of a circular path generally parallel to the path of the workpiece, clamping the workpiece to the moving workstation, and performing work on the workpiece. A portion of the workstation moves into a fixed actuation structure which actuates a clamp on the workstation to clamp the workpiece.

6 Claims, 5 Drawing Sheets

_Fig-4_

_Fig-5_

_Fig-6_

Fig-10

CONVEYOR FOR WORKSTATIONS

This is a continuation of copending application Ser. No. 07/728,649 filed on Jul. 11, 1991, now U.S. Pat. No. 5,157,999.

BACKGROUND OF THE INVENTION

This invention relates in general to a conveyor system for sequentially moving a plurality of workstations through a work area.

Workstations within the scope of this invention include platforms carrying tools for performing any type of work on a workpiece. Several conveyors for moving various types of workstations are known. One type of workstation may cut a continuous moving workpiece downstream from a rolling station where the workpiece is formed. Such workstations move at a speed which approximates the speed of the workpiece, and are used to cut continuously formed materials such as rods, pipes, bar stock, tubing and elongate materials for making items such as pencils or cigarettes.

In some prior art conveyors, reciprocating workstation accelerators accelerate the workstation to a speed where it approximates the speed of the workpiece. The workstation then clamps and performs work on the workpiece, and reciprocates back to a start position, awaiting the start of the next acceleration. These systems are deficient in some regards. The return reciprocation and the time necessary to accelerate the workstation from a stopped position, to the workpiece speed, requires a minimum time between sequential working of the workpiece. These factors limit the frequency with which the workstations may work on the workpiece. When the work is cutting this also limits the ability to cut small portions of the moving workpiece.

Conveyors have been developed which include two such reciprocating accelerators spaced on opposed lateral sides of the workpiece. Although such systems reduce the necessary time between cuts, they do not completely eliminate the restriction.

Other known systems may move a plurality of workstations by a continuous member such as a chain. The chain typically has a plurality of workstations at fixed locations such that they work sequentially on a workpiece. Such systems are inflexible and do not allow an operator to control the spacing between the sequential workstations.

Systems are known in the prior art where a plurality of members are moved about a track-like structure, and the distance between the plurality of work performing members may be controlled. Such systems have not been used to work sequentially on a workpiece, however, and thus do not address the above-discussed problems.

SUMMARY OF THE INVENTION

A method of conveying workstations through a work area is disclosed. In the disclosed embodiments, the only restriction on the distance between sequential workstations is the size of the workstations themselves. The inventive systems allow the control of the distance between sequential workstations such that an operator may choose the exact spacing between the sequential work on the workpiece.

In disclosed embodiments, a plurality of workstations are moved sequentially along a first path generally parallel to the workpiece. Work is performed on the workpiece by the workstation while moving along the first path, in an area defined as the work area. The workstation is then moved along a second path generally parallel to the first path, and in an opposed direction. The second path is spaced further from the workpiece then the first path.

The spacing between the plurality of workstations is controlled to achieve a desired spacing between work on the workpiece. As one example, if a continuously moving workpiece such as bar stock is to be cut by a workstation, by controlling the spacing between sequential workstations, one may control the length of the cut bar stock pieces.

In preferred embodiments of the present invention, there are separate motors driving each individual workstation. The motors are electronically controlled and may have a counter element which provides an indication of the position of the workpiece along the paths. Additional feedback structure is preferably utilized, at least immediately upstream of the work area, to give an exact indication of the position and speed of the workpiece to a controller. The controller preferably sends signals to the motor to adjust the speed or position of the workpiece as it approaches the work area, should the position or speed differ from a predetermined or desired position or speed.

Preferably, the workstations are moved parallel to the moving workpiece while moving through the work area. Further, when working on a moving workpiece the workstation is preferably maintained at a speed which approximates the speed of the moving workpiece while moving through the work area.

In a preferred embodiment, the workstations are guided in a first guide track through 360 degrees of movement, and are guided in a second guide track while moving through the work area. A spring preferably biases the workstation to an extended position, and the second guide track forces the workstation against the force of the spring to maintain the workstation parallel to the workpiece while in the work area.

The second guide track preferably has an entry section at an upstream portion of the work area. When the spring biases the workstation to the extended position a guide member on the workstation is aligned with the entry section and the workstation is guided into the second guide track.

More preferably, the second guide track has lateral guide walls which guide the workstation, and a bottom ramp surface which engages a cam follower associated with the workstation to give a signal to the workstation that the workstation is at particular portion of the first path. This signal may be used to actuate a tool, such as a clamp, to begin or end work on the workpiece. Alternatively, the cam track may be separate from the guide track.

In a preferred embodiment of the present invention the workstations are all rotatably mounted on a central spindle. Each workstation is driven by a separate motor, and the workstations are rotatably received on the spindle at different axial positions along the spindle. Each workstation has guide members associated with the first and second guide tracks, with the guide members being at the same axial position relative to the spindle and received in common guide tracks. A feedback track is preferably associated with the second guide track, and each workstation has a feedback member associated with the feedback track. A signal indicative of the actual position of the workstation is sent from the feedback track to a controller as the workstation approaches the work area. The second guide track preferably has an exit position which guides the workstation directly perpendicular to an axis of movement of the workpiece to remove tools on the workstation from interfering with further movement of the workpiece.

A controller receives signals from the individual motors for the workstation and the feedback members, and is also programmed to achieve a desired spacing between work on the workpiece by the sequential workstations. The controller determines whether the workstation approaching the work area is at the location and speed that is necessary to achieve the desired spacing. The controller signals the motor for the individual workstation to correct the position and speed such that they are as desired when approaching the work area. The controller is preferably easily programmed to change the desired spacing.

It is also anticipated that different workstations could perform different types of work. As an example, one workstation could cut and the next punch a hole. The above disclosed controls would still be utilized.

In a further embodiment of the present invention, a track receives and guides the workstations. A central spindle has a number of reels which contain electric supply wire leading to each workstation, and which supply power for movement of the workstation, and for tools on the workstation. The workstations move about a path on the track and perform work on a workpiece while moving through a work area.

In a further embodiment of the present invention, a track similar to that described includes exit and entrance ramps. The workstations may exit for removal or repair and re-enter on the ramps. With this embodiment it is preferred the power for the workstation be obtained directly from the track, rather than a central supply.

A unique clamp is disclosed having a pair of opposed clamp members which pivot about an axis generally parallel to the axis of the workpiece while the clamp is moving through the work area. The clamp is in an outwardly pivoted release position, spaced away from the workpiece as the workstation is moved towards the first path. Portions of the clamp break a vertical plane defined through the central axis of the workpiece as the workstation approaches the work area. The clamp is then moved to a clamping position where it clamps the workpiece. Work is performed on the workpiece by the workstation and the clamp then returns to a release position. The clamp is then moved back through the vertical plane described above, and the workstation is moved away from the workpiece.

These and other objects and features of the present invention can be best understood from the following specification and drawings, of which the following is a brief description.

DETAILED DESCRIPTION OF PREFERRED EMBODIMENTS

Figure 1:
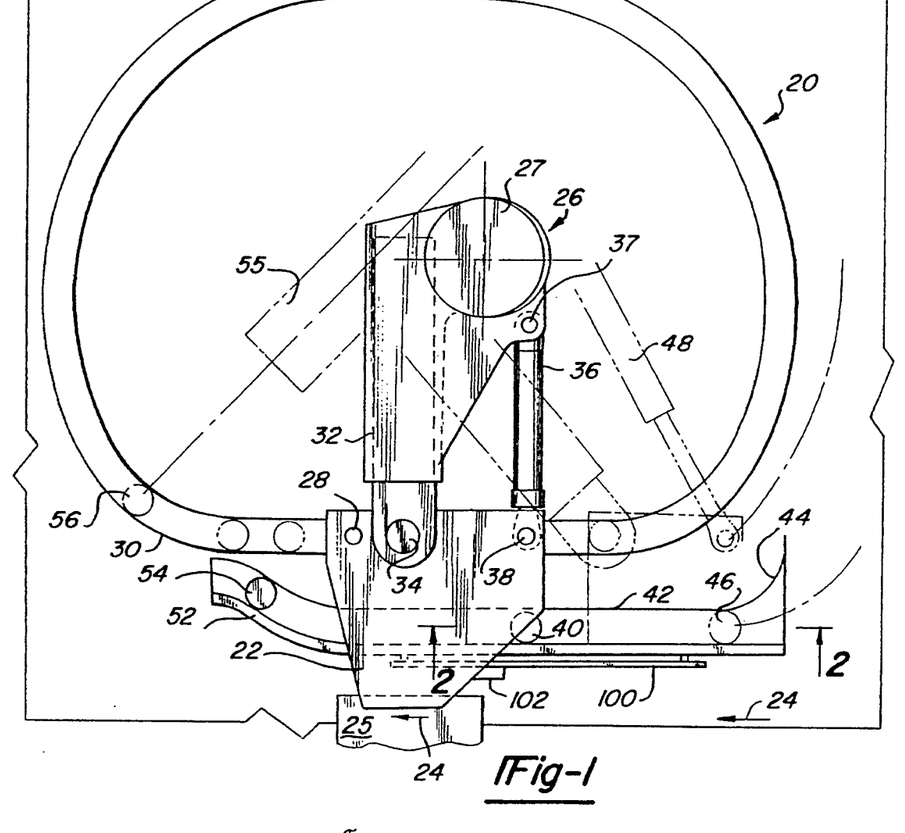
FIG. 1 is a largely schematic plan view of a conveyor for moving workstations.

Workstation conveyor system 20 is illustrated in FIG. 1. A plurality of workstations one of which 22 is shown, are moved through a largely curved path such that they sequentially pass along workpiece 24 while moving through work area 25. The movement is clockwise as shown in this figure. Workstation 22 performs some work on workpiece 24 as it moves through work area 25. This invention is not limited to any particular type of work or workpiece, but could include any machining of workpiece 24, including clamping and cutting of workpiece 24, or any other type of industrial operation which may be performed on a workpiece. Once workstation 22 has performed work on workpiece 24, it moves further around the largely curved path, and a subsequent sequential workstation moves into work area 25, where it works on workpiece 24.

Workpiece 24 may be moving continuously through work area 25 while being worked upon by the workstations, as when work area 25 is downstream of the outlet of a rolling station for forming workpiece 24. Alternatively, workpiece 24 could move, or be moved, into work area 25, stop, be worked on by workstation 22, and then move out of work area 25.

Drive 26, disclosed in detail below, operates to move the workstations 22 about a curved path on spindle 27. Each workstation preferably has a separate drive motor such that the distance between adjacent workstations may be controlled. This allows an operator freedom in controlling the timing, spacing, or interval between machining of workpiece 24 by sequential workstations. Some means for delivering power to workstation 22 such that tools on workstation 22 may be powered may be included.

Forward roller 28 is mounted on a forward end of workstation 22, and is received within guide 30, preferably through 360 degrees of rotation of workstation 22. Follower arm 32 is mounted on spindle 27 and pivotally connected 34 to workstation 22. Spring cylinder 36, which is preferably a gas spring, is pivotally connected 37 to the follower arm, and pivotally connected 38 to workstation 22. Spring 36 biases workstation 22 about pivot point 34 to maintain workstation 22 in a proper attitude relative to workpiece 24 while approaching work area 25. Preferably, workstation 22 moves parallel to workpiece 24 in work area 25.

Rear roller 40 is engaged in guide track 42, which maintains workstation 22 moving generally parallel to workpiece 24. Entrance ramp 44 is defined at an upstream end of guide track 42. When workstation 22 has moved such that rear roller 40 approaches entrance ramp 44, spring 36 is biased to extended position 48. In this position, rear roller 40 is in position 46 such that it is guided into entrance ramp 44. Follower arm 32 is forced inwardly or outwardly as rollers 28 and 40 follow guides 30 and 42. Once rear roller 40 is received in guide 42, workstation 22 is constrained to move parallel to workpiece 24 through work area 25. This ensures that any tools on workstation 22 are maintained in a proper attitude relative to workpiece 24.

As workstation 22 approaches work area 25, guide track 42 begins to force pivot point 38 towards spring 36. As shown in FIG. 1, when workstation 22 is in work area 25, the piston of spring 36 is almost entirely received within the cylinder. Workstation 22 is thus moving through a path generally parallel to the moving workpiece 24 while moving through work area 25.

Once workstation 22 has rotated beyond work area 25, rear roller 40 encounters rearward ramp 52 and is guided to release position 54. In this way, workstation 22 is smoothly guided rearwardly relative to workpiece 24. This assists in releasing workpiece 24 from any tools on workstation 22. As an example, if workstation 22 includes a cutting element which cuts through workpiece 24, by moving rear roller 40 through rearward ramp 52, the cutting element is withdrawn directly laterally from workpiece 24, and does not interfere with workpiece movement.

After workstation 22 has moved through rearward ramp 52, rear roller 40 is released from guide track 42. Once released from guide track 42, spring 36 again expands to the length shown at 48. Forward roller 28 is still guided in guide track 30, and the workstation continues to move through its path. Follower arm 32 is shown at 55 with roller 56 received in guide 30. At that position, rear roller 40 is removed from guide 42 and spring 36 is biased to its extended position. Workstation 22 moves through its path and rear roller 40 is again aligned with entrance ramp 44. Linear motors may alternatively be used to position workstation 22. These motors could perform the functions of either, or both, tracks 30 and 42.

Workstation 22 could be said to move through a generally curved path to a return path along the top of FIG. 1, and removed from the workpiece. This returns workstation 22 in a direction generally opposed to the direction it moves in the first path. Workstation 22 then moves through a generally curved path back to the first path.

As also shown in FIG. 1, a magnetic feedback rail 100 is positioned directly below guide track 42. Feedback members 102, shown schematically on each workstation, interact with feedback rail 100 to give an indication of the speed and exact position of the workstation as it is approaches work area 25.

Figure 2:
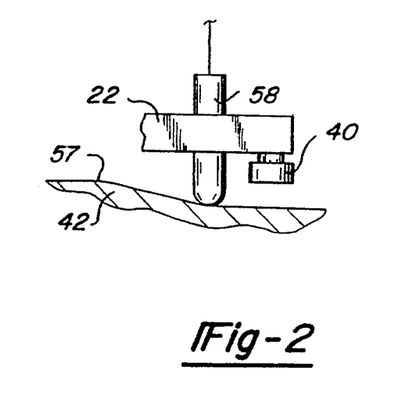
FIG. 2 is a partial cross-sectional view along line 2 as shown in FIG. 1.

FIG. 2 shows an optional camming feature incorporated into guide track 42. Rear roller 40 need not extend vertically to the bottom of guide track 42. Instead, it could be guided at its lateral sides. In such a system, an upwardly extending cam surface 57 may be formed on the bottom wall of guide track 42. Cam surface 57 may actuate cam follower 58, shown schematically, incorporated into workstation 22. Cam follower 58 may be utilized to actuate or deactuate tools of workstation 22. As an example, surface 57 can give an exact indication to a tool through cam follower 58 that it is time to clamp, cut, unclamp or otherwise work on workpiece 24. This allows the tools to be actuated or released at an identical position on every work cycle. Alternate, and additional details of this feature are disclosed with reference to FIG. 10.

Figures 3A, 3B:
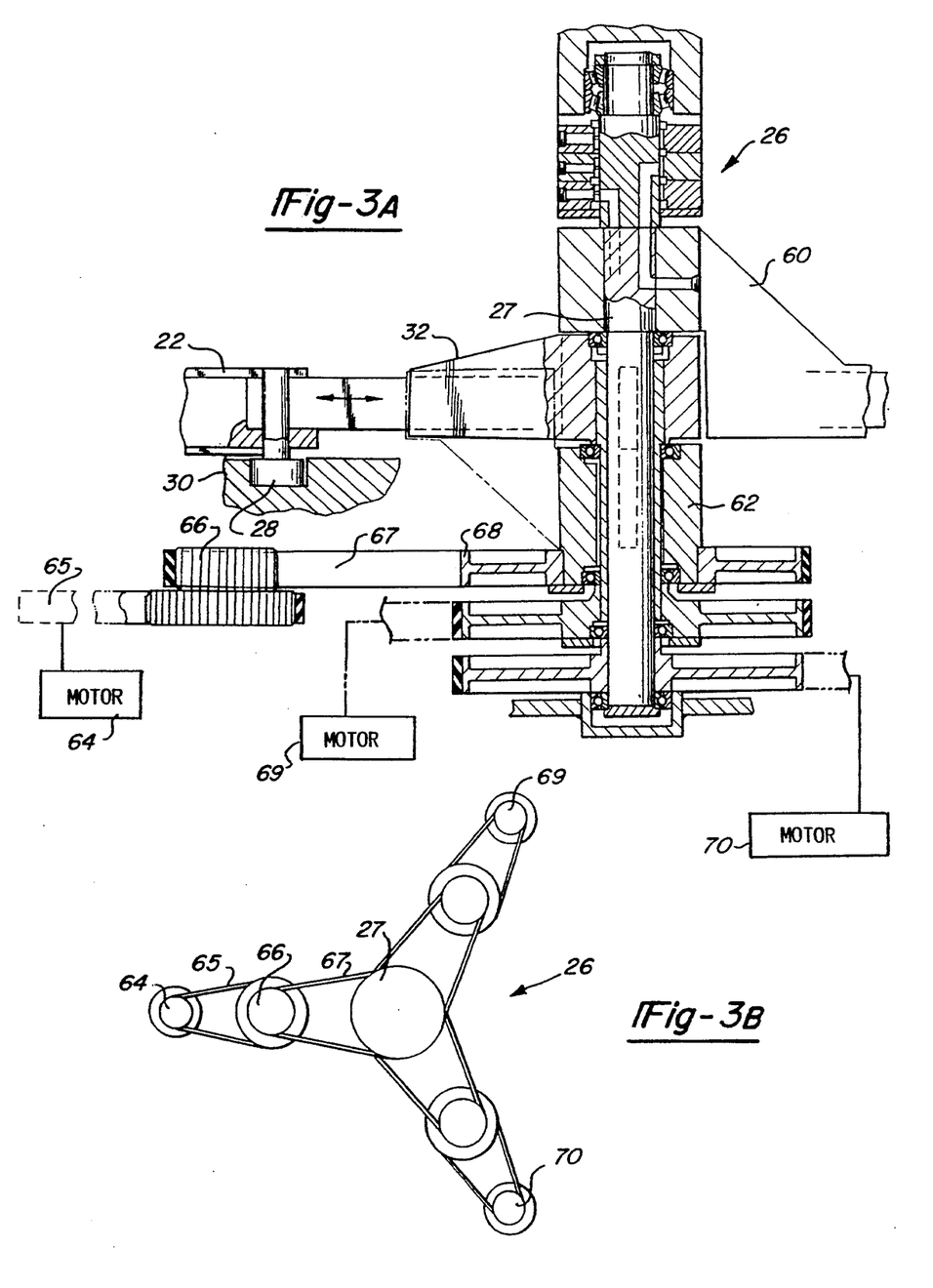
FIG. 3A is a cross-sectional view through a portion of the conveyor illustrated in FIG. 1.
FIG. 3B is a largely schematic top view showing further details of the drive for the conveyor illustrated in FIG. 1.

Drive 26 for rotating workstation 22 is illustrated in FIG. 3A. As shown, follower arm 32 is mounted on spindle 27. A subsequent workstation 60 is mounted above workstation 22, and extends downwardly such that its rollers, not shown, are on the same vertical plane as rollers 28 and 40 for workstation 22. Similarly, third workstation 62 extends vertically upwardly such that its rollers are on the same vertical plane as rollers 28 and 40 for workstation 22. The rollers are preferably all received in the same tracks 30 and 42. Workstations 22, 60 and 62 are spaced about the curved path, and are rotated through that path such that they sequentially pass through work area 25. Motor 64 drives workstation 62 through timing belt 65, idler gear 66, timing belt 67 and pulley 68. Similarly, motor 69 drives workstation 22 and motor 70 drives workstation 60. Motors 64, 69 and 70 are all preferably electric motors, independently controlled to allow control of spacing between workstations 22, 60 and 62. By controlling the relative speeds of the workstations one can control the spacing between the workstations, and control the timing or spacing between machining of workpiece 24 by the sequentially rotating workstations 22, 60, 62. Further, one may ensure that the workstations are all moving at the proper speed when moving through work area 25.

FIG. 3B illustrates motors 64, 69 and 70 spaced circumferentially about spindle 27. As shown, each of the motors include a timing belt 65 driving an idler gear 66, which in turn drives a timing belt 67 received on a pulley for the individual workstations.

Each motor is preferably an electronically controlled AC servo motor available from Nikki Denso of Japan, 1000 Series, Model Number NA 20-750F. The motors preferably include electronic counters to accurately count the amount of rotation, and give an indication of the position and speed of the various workstations to a controller described below, for the overall conveyor system. The controller receives position feedback signals from the counters for each motor 64, 69 and 70, and determines the positions of the workstation. Further, feedback signals from feedback rail 100, see FIG. 1, are also directed to the controller as the workstation is moving along guide track 42 towards work area 25.

Figures 4, 5:
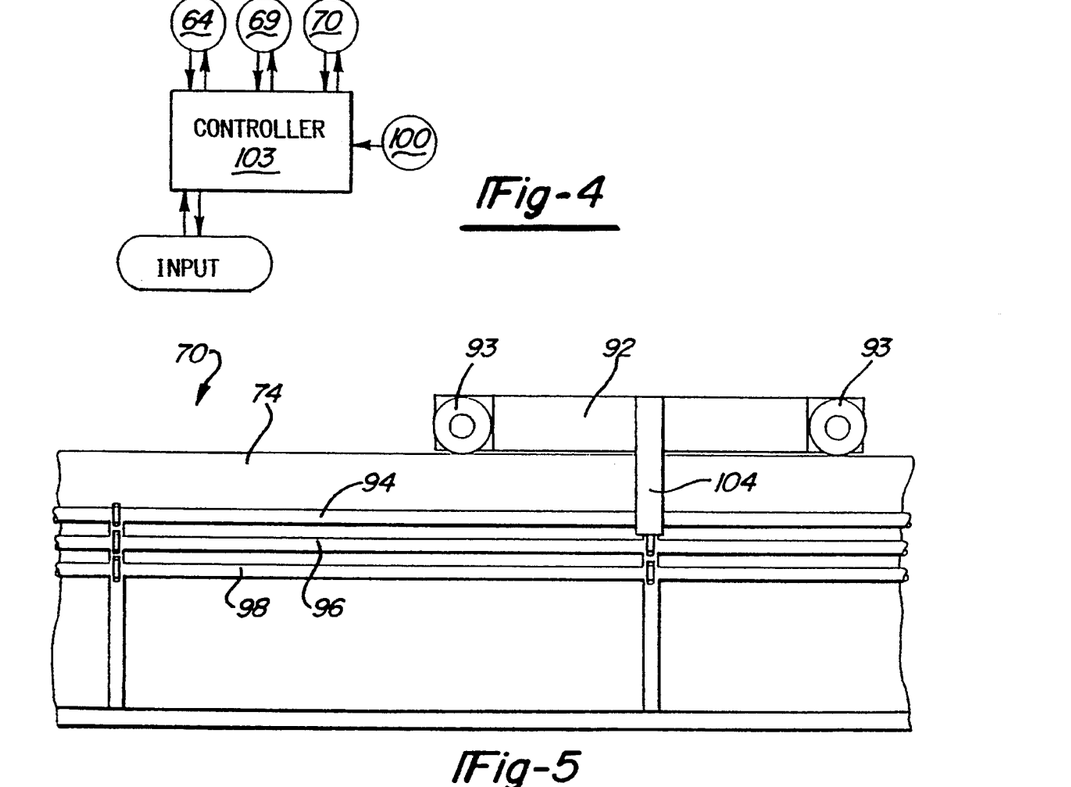
FIG. 4 is a schematic of a controller circuit for the conveyor illustrated in FIG. 1.
FIG. 5 is a side view of a workstation.

A controller 103 for system 20 is illustrated in FIG. 4. Controller 103 receives signals from the counters for motors 64, 69 and 70 indicating the position of the respective workstations relative to the work area. Further, controller 103 receives feedback signal from feedback rail 100, and input signals from an operator to identify a desired spacing between the workstations passing through the work area. Controller 103 determines a desired spacing between the sequential workstations and sends signals to motors 64, 69 and 70 indicating where their respective workstations should be relative to the other workstations, and the workpiece. As a particular workstation is approaching work area 25, it begins to send a signal through feedback member 100 to controller 103. Controller 103 determines whether this actual speed and position of the workpiece is as desired. If it is not, the controller 103 sends a signal to the respective motor to correct the speed and position of the particular workstation. Further, as the workstation approaches the work area controller 103 may increase its speed from a lower return speed, up to a speed synchronized with tile workpiece speed. The controller would preferably calculate an ideal speed profile based on the distance between work. It may sometimes be necessary for the return speed to be greater than the workstation speed.

Further, for a moving workpiece, controller 103 would also include the speed of the workpiece such that it can calculate the desired speed of the workstation, and the desired spacing between the workpieces. The hardware and software necessary for controller 103 are well known in the art, and form no part of this invention.

FIG. 5 shows details of an alternative conveyor 70. Workstation 92 is mounted on wheels 93 on first path 74. A plurality of feedback rails 94, 96 and 98 are illustrated extending along path 74. Feedback member 104 is associated with workstation 92, and is received on feedback rail 94. Feedback track 94 gives an indication to a controller for system 70 of the exact location of workstation 92 on conveyor 70. The controller then determines desired motor speeds for the workstations to achieve a desired position and speed.

Figure 6:
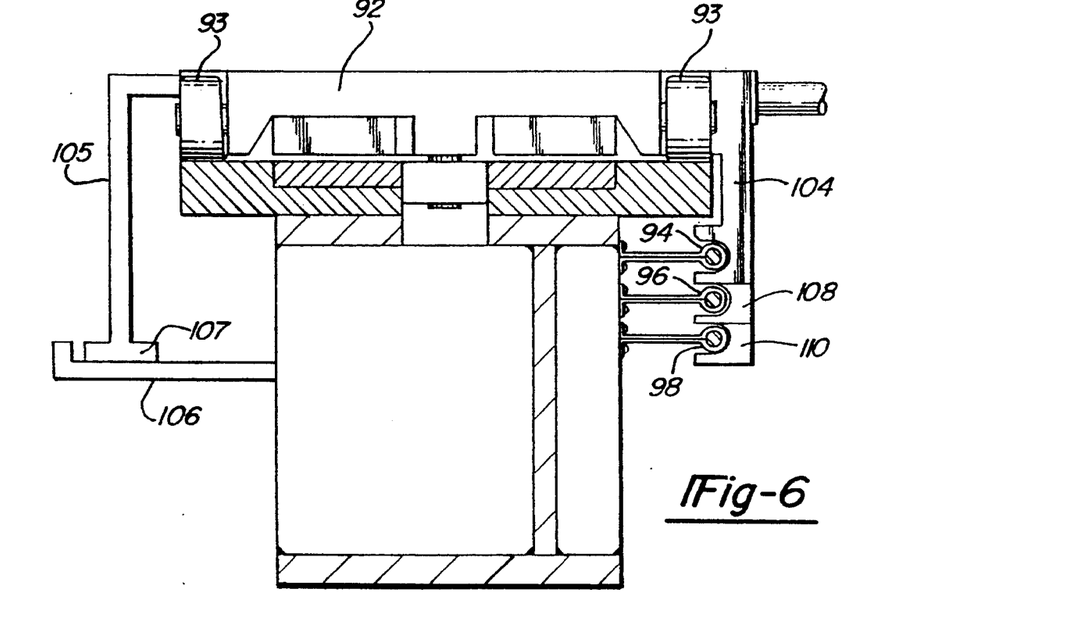
FIG. 6 is a front view of the workstation illustrated in FIG. 5.

As shown in FIG. 6, workstation 92 includes feedback member 104 received on feedback rail 94. A power connection member 105 extends from a body of workstation 92 to shoe 107 received on power track 106. Shoe 107 supplies power to workstation 92 for its movement, and for operation of any tools that are received on workstation 92. Feedback members 108 and 110 are shown on rails 96 and 98. Feedback members 108 and 110 would be associated with subsequent workstations, similar to workstation 92. The feedback rails are of a known type and pick up magnetic signals from the workstation feedback members. Such a system may also be used in the conveyor of FIG. 1.

Figure 7:
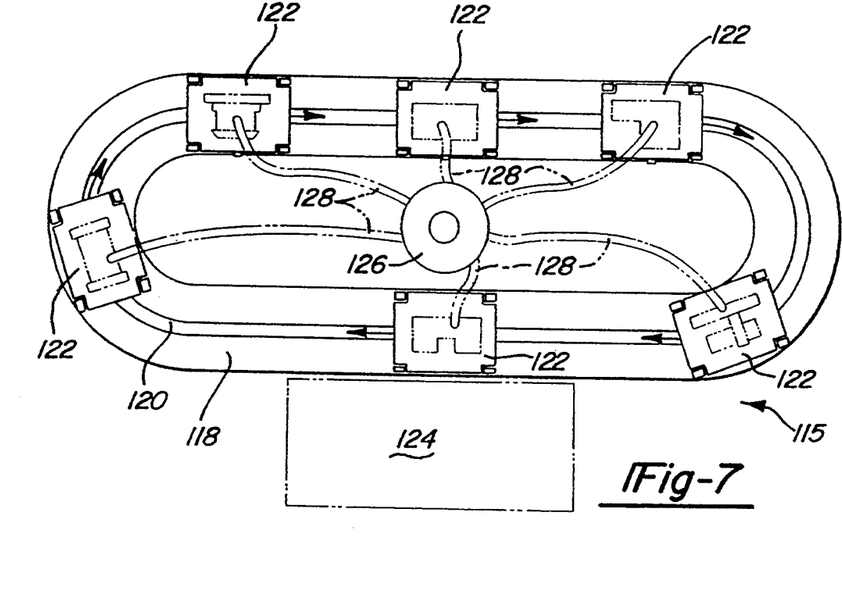
FIG. 7 is a largely schematic plan view of a second embodiment conveyor.

FIG. 7 shows a second embodiment conveyor 115 which includes conveyor path 118 extending through 360 degrees. Central track 120 receives a guide member from workstations 122 and guides the workstations about the path. Workstations 122 move sequentially through work area 124. A central power supply post 126 supplies power to workstations 122 through lines 128. The power supplied to workstations 122 through lines 128 may be used both for moving workstations 122 and powering tools. Some feedback of the exact position and speed of workstation 122 may be utilized.

Figure 8:
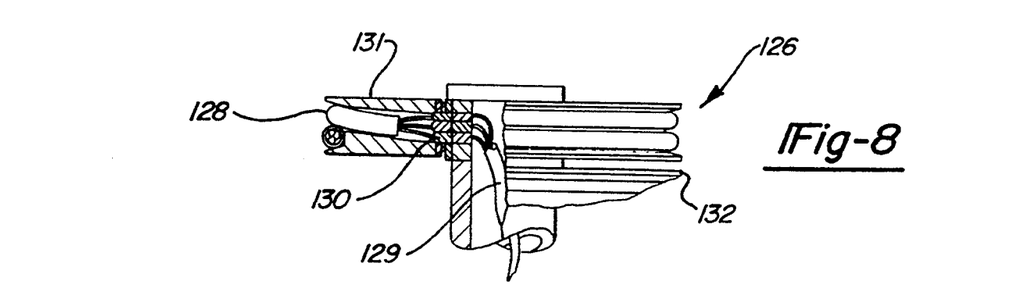
FIG. 8 is a cross-sectional view of a portion of the conveyor illustrated in FIG. 7.

As shown in FIG. 8, a plurality of mating reel connections 130 connect power supply 129 to each line 128. Reel 131 rotates on a central post such that the power is continuously supplied through line 128 to one workstation 122. The reels are spaced vertically, with a second reel 132 also shown. An individual reel is used for each workstation.

Figure 9:
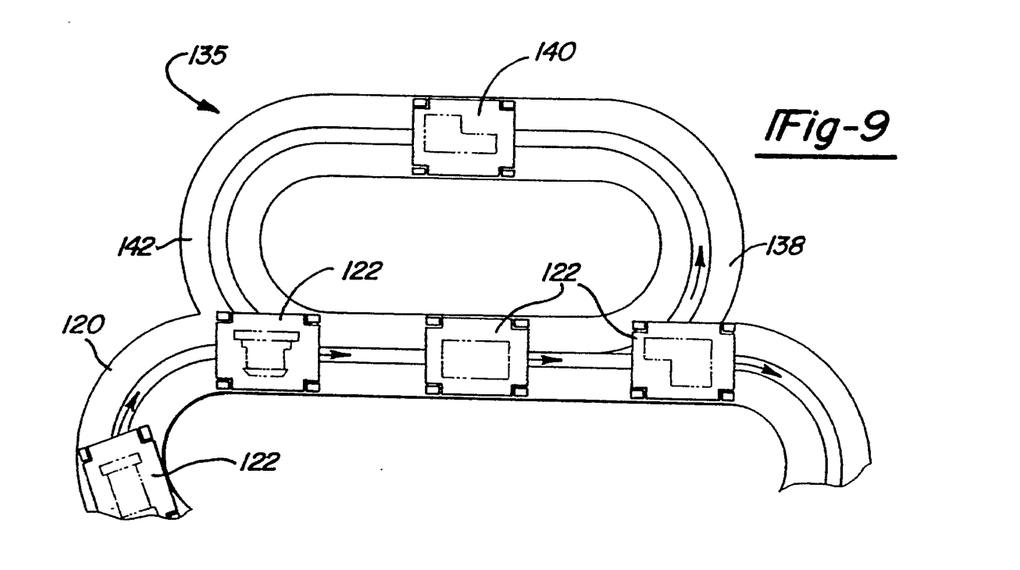
FIG. 9 is a partial, largely schematically plan view, illustrating a third embodiment conveyor.

A third embodiment conveyor 135 is illustrated in FIG. 9. In third embodiment 135 workstations 122 are guided on path 120 similar to that shown in FIG. 7. However, power is not supplied through a central post and wires. Instead, the workstations obtain power for movement and for tools on the workstations through track 120. Any known method of obtaining power from a track may be utilized. Exit ramp 138 allows a workstation, such as workstation 140, to be moved off of track 120 when it is desired to remove a workstation. Again, this may be done to repair workstation 140, or simply to reduce the number of workstations on track 120. An entrance ramp 142 allows workstation 140 to re-enter conveyor 135.

The subsequent embodiments would all preferably have a controller functionally similar to that illustrated in FIG. 4. Further, the motors for moving the workstations in these embodiments may be electric motors disposed on the workstations, or alternatively in the various tracks.

Figure 10:
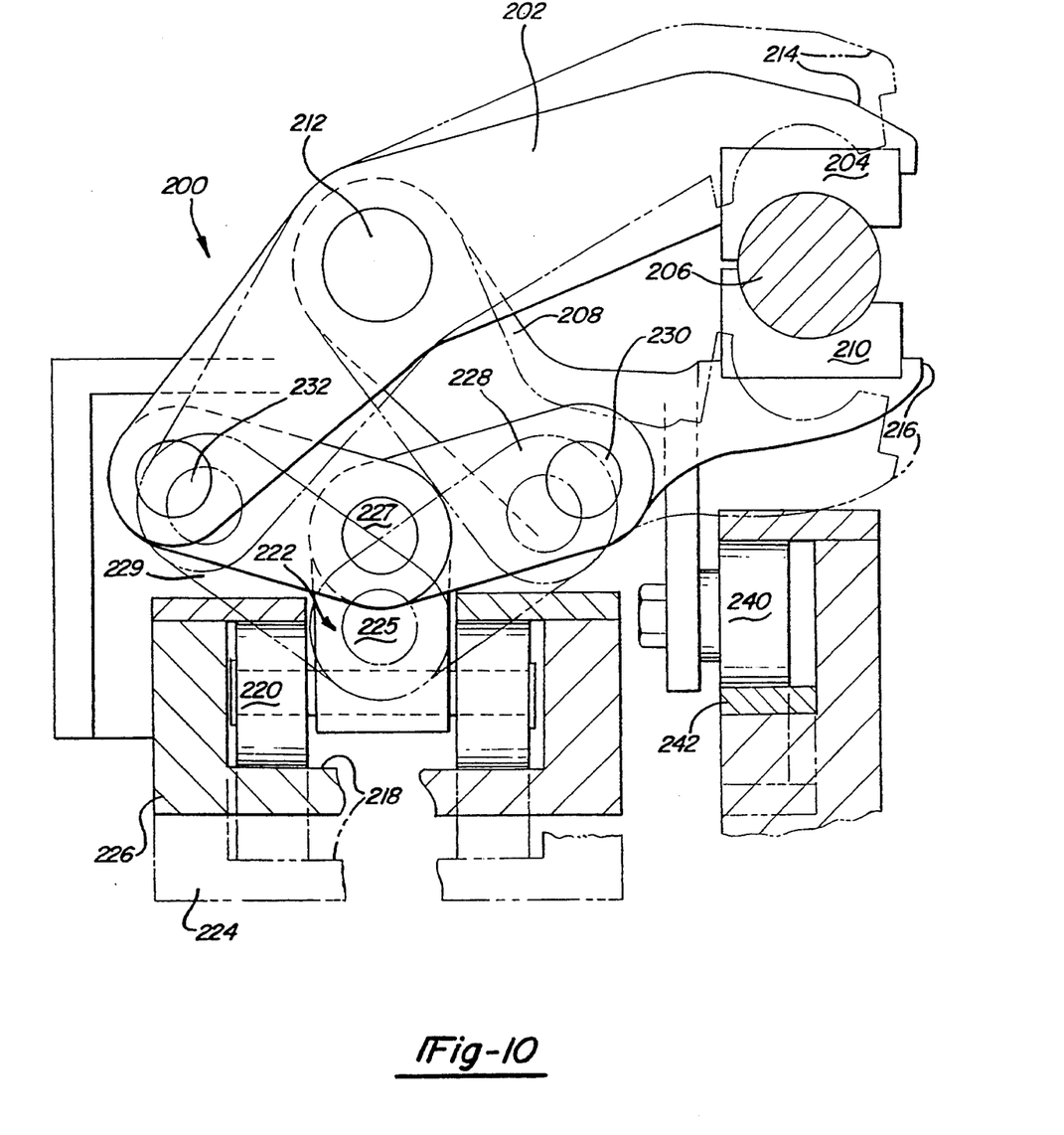
FIG. 10 is a cross-sectional view of a unique clamping system which may be incorporated into any of the above-disclosed conveyors.

A clamping system 200 which may be incorporated into any of the above-described workstations is illustrated in FIG. 10. Clamping system 200 comprises top clamp 202 having surface 204 on workpiece 206, and bottom clamp 208 also having surface 210 engaging workpiece 206. Top clamp 202 pivots about pivot point 212 on a workstation, between an illustrated clamped position, and released position 214 shown in phantom. At release position 214, surface 204 is removed from workpiece 206. Similarly, the lower clamp member 208 is pivoted about pivot point 212 between its clamped position and released position 216, also shown in phantom.

A cam arrangement functionally similar to that illustrated schematically in FIG. 2 is utilized to actuate the clamp between the release and clamped positions. The cam arrangement includes track 218 which receives wheels 220 associated with cam follower 222. Track 218 may have a downstream location 224, shown in phantom, which is vertically lower than position 226.

As the workstation moves between positions 224 and 226, wheels 220 are moved vertically upwardly along the ramped surface of track 218. Cam follower 222 moves from a lower released position 225, to an upper clamping position 227. Toggle 228 is pivotally connected at 230 to lower clamp member 208, and toggle 229 is pivotally connected at 232 to upper clamp member 202. When cam follower 222 moves vertically upwardly to position 227, toggles 228 and 229 cause clamp members 202 and 208 to pivot about pivot point 212 and move to the clamped position. When cam follower is in its lower position the clamp members are moved to the release positions. A similar but reversed ramp portion is included at the end of the work area to release clamping system 200 from the workpiece.

This pivoting clamping structure allows the workstations to turn into the first path prior to approaching the work area. Since the workpiece is continuous the clamp must break a plane defined vertically through the central axis of the workpiece, while the workpiece is also in the plane. It is thus beneficial that the clamp members pivot outwardly away from the workpiece such that the workstation can move to the first position. When a rearward ramp 52 such as shown in FIG. 1 is utilized, it can be seen that clamp members 202 and 208 are moved directly rearwardly towards spindle 27. In this way, the pivoted clamp members do not interfere with movement of the workpiece.

In the movement of clamping system 200 on a workstation according to the present invention, the clamping members 202 and 208 are initially fully received on one side of a plane defined vertically through the central axis of workpiece 206. As shown in FIG. 10, the workstation associated with clamping system 200 has moved adjacent to the work area. It should be understood that earlier in the travel of the workstation the clamp would be removed from the workpiece, and thus wholly on one side of the vertical plane described above. As the workstation approaches the workpiece, portions of the clamp break the vertical plane described above and work is performed on the workpiece. Once the work is performed, the clamping members are moved back onto one side of the above described vertical plane.

A separate guide roller 240 and track 242 are shown. This is an alternative to track 42 and roller 40 as shown in FIG. 1.

In general, the above-described systems are shown somewhat schematically. The systems are formed of well known components, and a worker of ordinary skill in the art would be able to identify particular components which will achieve the above-discussed features of the invention. Further, it should be understood that the various controllers can vary the speed of the workstations along the path. It may sometimes be beneficial to slow the speed of the workstation along the second or return path and then accelerate it towards the speed of the workpiece as it moves towards the work area. This return speed can be varied depending on the desired spacing of the workstations.

Although, the disclosed embodiments include workpieces moving in a straight line, the workpiece could sometimes move in a curved line. The first path would then also be curved, but would remain parallel to the workpiece in the work area.

Preferred embodiments of the present invention have been disclosed, however a worker of ordinary skill in the art would recognize that certain modifications would come within the scope of this invention. For that reason the following claims should be studied in order to determine the true scope and content of this invention.

I claim:

1. A tool comprising:
   a moving working element, said moving working element adapted for moving along a circular path and performing work while moving along a first length of said path;
   a portion of said working element moving into a fixed actuation structure while moving into said first length of said path, and then moving out of said first length, said actuation structure including a cam surface, said portion moving along said cam surface, said cam surface being configured to actuate said portion to actuate said working element.

2. The tool as recited in claim 1, wherein said actuation structure includes guide structure with lateral walls, said portion including a guide member received between said lateral walls, said cam surface being formed on a vertically lowermost surface of said actuation structure, said cam surface being located in an area where an actuation signal is desired, said portion moving along in contact with said cam surface and being moved vertically by said cam surface to actuate said working element.

3. The tool as recited in claim 1, wherein said portion is forced vertically upwardly to actuate a clamp member.

4. A tool system comprising:
   a rotating work element adapted to rotate into a path, and performing work while moving along said path, said work element carrying a clamp, said clamp being adapted to clamp a moving workpiece such that work is performed on said moving workpiece, said clamp including two pivoting members which pivot about an axis on said work element, said two clamp members breaking a plane extending through an axis of movement of said moving workpiece, and then being actuated to clamp said moving workpiece.

5. The tool system as recited in claim 4, wherein said clamp includes an actuation member received in a guide structure while said work element moves along said path, said actuation member including a portion received between two walls of said guide structure, said portion including a pair of rollers which roll along a bottom of said guide structure, said guide structure being shaped such that it causes said rollers to move while said work element is moving along said path to actuate said clamp.

6. The tool system as recited in claim 5, wherein a pivot point for said clamp includes a toggle mechanism connected to one of said two pivoting members, such that movement of said rollers vertically causes said toggle element to actuate and move said two pivoting members to a clamping position.

* * * * *